United States Patent
Shinoda et al.

(10) Patent No.: US 8,694,038 B2
(45) Date of Patent: Apr. 8, 2014

(54) MOBILE STATION AND ANTENNA VERIFICATION CONTROLLING METHOD FOR MOBILE STATION

(75) Inventors: Yusuke Shinoda, Kawasaki (JP); Hiroyuki Ataka, Kawasaki (JP); Daiki Chou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 12/466,982

(22) Filed: May 15, 2009

(65) Prior Publication Data

US 2009/0227208 A1 Sep. 10, 2009

Related U.S. Application Data

(63) Continuation of application No. PCT/JP2006/325097, filed on Dec. 15, 2006.

(51) Int. Cl.
*H04B 7/00* (2006.01)

(52) U.S. Cl.
USPC ...... 455/515; 455/67.16; 455/502; 455/562.1

(58) Field of Classification Search
USPC ............. 455/515, 516, 517, 63.4, 65, 66.1, 455/67.16, 69, 101, 561, 502, 562.1, 522; 375/148, 144, 147, 260, 267, 347, 349
See application file for complete search history.

(56) References Cited

U.S. PATENT DOCUMENTS

| | | | |
|---|---|---|---|
| 7,149,258 B2 | 12/2006 | Nilsson et al. | |
| 7,715,806 B2 | 5/2010 | Erceg | |
| 8,005,440 B2 | 8/2011 | Ishii et al. | |
| 2002/0048315 A1* | 4/2002 | Hanada et al. | 375/145 |
| 2005/0054318 A1* | 3/2005 | Fujii et al. | 455/272 |
| 2005/0250526 A1* | 11/2005 | Lindoff et al. | 455/522 |
| 2006/0176858 A1 | 8/2006 | Ishii et al. | |
| 2007/0036204 A1* | 2/2007 | Ishii et al. | 375/148 |
| 2007/0099670 A1* | 5/2007 | Naguib et al. | 455/562.1 |

FOREIGN PATENT DOCUMENTS

| | | |
|---|---|---|
| CN | 1805306 | 7/2006 |
| JP | 2004179931 | 6/2004 |
| JP | 2006222937 | 8/2006 |
| JP | 2006261951 | 9/2006 |
| JP | 200749366 | 2/2007 |

OTHER PUBLICATIONS

International Search Report dated Mar. 20, 2007.
Chinese Office Action mailed Sep. 1, 2011 for corresponding Chinese Application No. 200680056612.6, with English-language translation.
Extended European Search Report dated Jan. 13, 2013 for corresponding European Application No. 06834824.2.

* cited by examiner

*Primary Examiner* — Ping Hsieh
(74) *Attorney, Agent, or Firm* — Fujitsu Patent Center

(57) ABSTRACT

Antenna verification is controlled in the ON state at least until transmission to a wireless base station is started, and particularly, a result of estimation of the signal phase individually from two antennas of the wireless base station is reflected on a reception signal process, to decrease the failure rate in synchronism establishment arising from that antenna verification of transmission diversity to be carried out for reception characteristic enhancement of the downlink is controlled in the OFF state in order to enhance the throughput characteristic as in a case wherein the HSDPA is applied.

4 Claims, 13 Drawing Sheets

MOBILE STATION AND ANTENNA VERIFICATION CONTROLLING METHOD FOR MOBILE STATION

CROSS-REFERENCE TO RELATED APPLICATION(S)

This application is a continuation Application of a PCT international application No. PCT/JP2006/325097 filed on Dec. 15, 2006 in Japan, the entire contents of which are incorporated by reference.

TECHNICAL FIELD

The present invention relates to a mobile station and an antenna verification controlling method for the mobile station, and particularly to a technique suitable for use, for example, with antenna verification control when transmission diversity of a mobile station is applied upon HSDPA (High Speed Downlink Packet Access) operation of a W-CDMA wireless communication system.

BACKGROUND ART

In a conventional W-CDMA wireless system, closed loop (closed loop) type transmission diversity is applied occasionally. For example, in transmission diversity disclosed in Patent Document 1 hereinafter described, phases (carrier phases) of reception signals from two transmission antennas of a wireless base station are detected in a wireless terminal such as a mobile station and an optimum reception state (diversity synthesis) is established in the wireless terminal based on a result of the detection. In more detail, phase controlling information (transmission antenna weight) for minimization (ideally to zero) of the phase difference between the two reception signals is produced and transmitted (fad back) as an FBI (Feedback Indicator) bit to the wireless base station so that the signal phases from the transmission antennas are adaptively controlled.

By adaptively controlling the signal phases from the two transmission antennas of the wireless base station using the FBI bit from the wireless terminal in this manner, a bit error arising from a drop of reception power by fading can be reduced.

However, as disclosed in the paragraphs 0024 and 0025 of Patent Document 1, since, if an error occurs with the FBI bit in the uplink, then the wireless base station carries out transmission using a carrier phase different from that expected by the wireless terminal, suitable phase control is not carried out and the error ratio increases.

Therefore, in the technique of Patent Document 1, the wireless terminal carries out, using a pilot symbol of a dedicated physical channel (DPCH: Dedicated Physical CHannel) of the downlink, antenna verification for estimating the transmission antenna weight (transmission carrier phase) in each slot of the DPCH. Particularly, since, in the wireless communication system of the W-CDMA method, transmission power control (TPC) is carried out normally so that the communication quality of the uplink becomes constant, while, as a result, also the FBI bit is mistaken in a fixed probability, a reception characteristic of the downlink can be enhanced by carrying out the antenna verification.

Also in the HSDPA, similarly as in the case described above, antenna verification of an HS-PDSCH (High Speed Physical Downlink Shared Channel) that is a shared channel of the downlink can be applied and carried out using a dedicated pilot symbol of an associated dedicated physical channel (Associated Dedicated Physical Channel: A-DPCH) of the downlink (for example, refer to Patent Document 1).

However, since, if the antenna verification of the HS-PDSCH is controlled with the dedicated pilot symbol of the A-DPCH, then the power of the A-DPCH is generally very low in comparison with that of the HS-PDSCH. Therefore, the error ratio of the FBI bit increases rather than the degradation ratio of the quality of the HS-PDSCH and the throughput characteristic degrades on the contrary because of the antenna verification. In the technique of the Patent Document 1, in order to eliminate such a problem as just described, the control of the antenna verification is not used during the HSDPA (a result of estimation of signal phases from two transmission antennas is not reflected).

Patent Document 1: Japanese Laid-open Patent Publication No. 2006-222937

DISCLOSURE OF THE INVENTION

Problems to be Resolved by the Invention

Where the A-DPCH and the HS-PDSCH of the downlink are started (opened), that is, where reception is started, at the same time in a bearer service of a wireless terminal or the like, there is a state (period) wherein actually the FBI bit does not reach the wireless base station within several frames from transmission starting of a DPCCH (Dedicated Physical Control Channel) that is the dedicated physical channel (DPCH) for controlling information of the uplink before establishment of synchronism of the uplink.

In this instance, if the wireless base station carries out transmission in the downlink in a state wherein the phase is fixed to an initial phase and the wireless terminal carries out the antenna verification, then it cannot be avoided to carry out the antenna verification based only on another FBI bit transmitted in the past (in particular, using the FBI as an initial value) within a period wherein the A-DPCH and the HS-PDSCH are not received.

Therefore, if a condition overlaps that, where the carrier phases of the DPCHs from the two transmission antennas of the wireless base station are opposite to each other, the power of one of the two transmission antennas is higher than that of the other one of the two transmission antennas, then, in the wireless terminal, an error occurs with transmission power controlling information (TPC command) transmitted with the DPCH of the downlink from the wireless base station and the probability that the wireless terminal may mistake a transmission power increasing instruction (TPC command="1") as a transmission power decreasing instruction (TPC command="0") increases. As a result, the mobile station steadily decreases the transmission power thereof and then results in failure in synchronism establishment of the uplink.

While the opposite phase state of the carrier phases of the DPCHs must originally be able to be cancelled by carrying out the antenna verification to rotate the phases of the DPCHs, if the antenna verification during the HSDPA is controlled in the OFF state from the beginning as in the technique of Patent Document 1, then the opposite phase state cannot be cancelled.

The present invention has been made in view of such a subject as described above, and it is an object of the present invention to reduce the ratio of failure in synchronism establishment that is caused by controlling the antenna verification of transmission diversity, which is carried out for enhancement of the reception characteristic of the downlink, in the OFF state in order to enhance the throughput characteristic as in a case wherein HSDPA is applied.

Means for Resolving the Problems

In order to attain the object described above, the present invention is characterized in that it uses a mobile station and an antenna verification controlling method described below.

(1) According to an aspect of the present invention, there is provided a mobile station for communicating with a wireless base station that controls the phase of signals to be transmitted from two antennas based on feedback information from the mobile station, the mobile station comprising a monitoring unit which monitors a communication state regarding an uplink to the wireless base station, an estimating unit which estimates the phase of the individual signals from the two antennas, a reception signal processor which carries out a reception signal process to a reception signal from the wireless base station based on a result of the estimation by the estimating unit, and a controller which controls whether or not the estimation result by the estimating unit is to be reflected on the reception signal processor in response to the communication state monitored by the monitoring unit.

(2) Here, the monitoring unit may comprise an upward synchronism establishment monitoring unit which monitors whether or not synchronism of the uplink with the wireless base station is established, and the controller may comprise a first controller which causes the estimation result to reflect on the reception signal process before the establishment of the synchronism of the uplink is detected by the upward synchronism establishment monitoring unit but not to cause the estimation result to reflect on the reception signal process after the synchronism is established.

(3) Or, the monitoring unit may comprise an upward transmission starting monitoring unit which monitors whether or not transmission of the uplink to the wireless base station is started, and the controller may comprise a second controller which causes the estimation result to reflect on the reception signal process at least before starting of the transmission of the uplink is detected by the upward transmission starting monitoring unit but not to cause the estimation result to reflect on the reception signal process after the transmission starting is detected.

(4) Further, according to another aspect of the present invention, there is provided an antenna verification controlling method for a mobile station that communicates with a wireless base station that controls the phase of signals to be transmitted from two antennas based on feedback information from the mobile station, the antenna verification controlling method comprising a monitoring step of monitoring a communication state regarding an uplink to the wireless base station, an estimation step of estimating the phase of individual signals from the two antennas, a reception signal processing step of carrying out a reception signal process to a reception signal from the wireless base station based on a result of the estimation at the estimation step, and a controlling step of controlling whether or not the estimation result at the estimation step is to be reflected on the reception signal process in response to the communication state monitored at the monitoring step.

(5) Here, at the monitoring step, it may be monitored whether or not synchronism of the uplink with the wireless base station is established, and, at the controlling step, a result of the estimation may be caused to reflect on the reception signal process before establishment of the synchronism of the uplink is detected at the upward synchronism establishment monitoring unit but the estimation result may not be caused to reflect on the reception signal process after the synchronism is established.

(6) Or else, at the monitoring step, it may be monitored whether or not transmission of the uplink to the wireless base station is started, and, at the controlling step, the estimation result may be caused to reflect on the reception signal process at least before starting of the transmission of the uplink is detected at the upward transmission starting monitoring unit but the estimation result may be not caused to reflect on the reception signal process after the transmission starting is detected.

(7) According to a further aspect of the present invention, there is provided an antenna verification controlling method for a mobile station that communicates with a wireless base station that controls the phase of signals to be transmitted from two antennas based on feedback information from the mobile station, comprising controlling an antenna verification in ON state before synchronism with the wireless base station is established, and controlling the antenna verification in OFF state after the synchronism is established.

(8) According to a still further aspect of the present invention, there is provided an antenna verification controlling method for a mobile station that communicates with a wireless base station that controls the phase of signals to be transmitted from two antennas based on feedback information from the mobile station, comprising controlling an antenna verification in ON state at least before transmission to the wireless base station is started, and controlling the antenna verification in OFF state after the transmission is started.

Effects of the Invention

With the present invention, the antenna verification is controlled in the ON state until synchronism of the uplink is established so that a correct phase difference between the CPICH #1 and the CPICH #2 can be detected without referring to an FBI bit history. Further, since, even if feedback information to the wireless base station does not reach the wireless base station and therefore the signal phases from the two antennas are fixed, the antenna verification operates (a result of estimation is reflected on the reception signal process), an opposite phase state of specific channels (for example, a shared pilot channel and a dedicated physical channel) of the downlink can be cancelled. Accordingly, the probability that transmission power controlling information of the downlink may be mistaken can be decreased and the probability that synchronism establishment of the uplink may result in success can be increased.

EXPLANATIONS OF LETTERS OR NUMERALS

Figure 1:
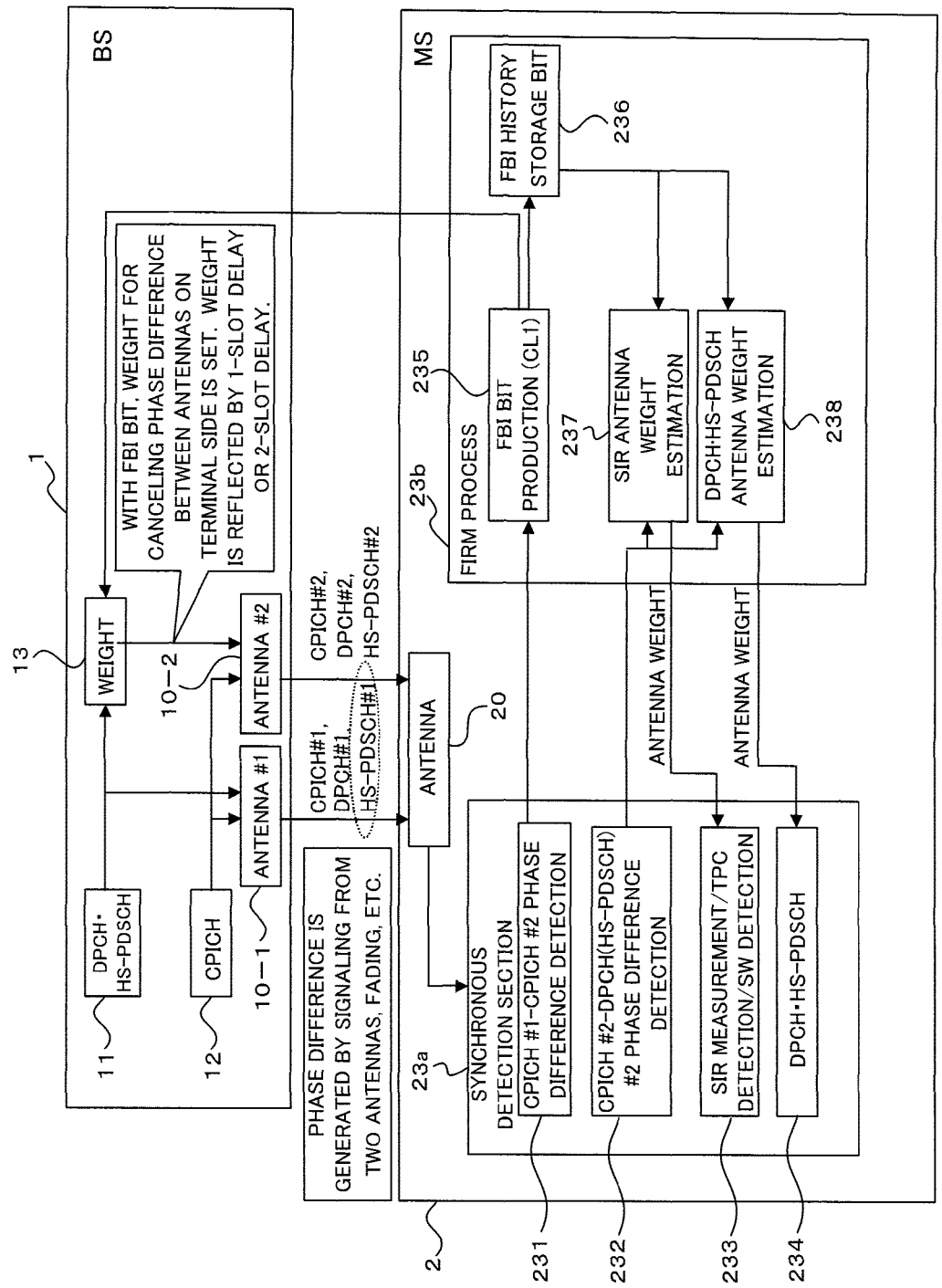
FIG. 1 is a block diagram illustrating a configuration of essential part of a wireless communication system for explaining antenna verification operation in transmission diversity according to a first embodiment.

1 wireless base station (BS)
10-1, 10-2 antenna
11 dedicated physical channel (DPCH) and shared channel (HS-PDSCH) processing section
12 common pilot channel (CPICH) processing section
13 weight (weighting) setting section
2 wireless terminal (mobile station: MS)
20 antenna
21 W-CDMA wireless frequency (RF) section
22 W-CDMA analog front end (AFE) section
23 W-CDMA baseband (BB) section
23a synchronism detection section
231 CPICH #1-CPICH #2 phase difference detection section
232 CPICH #2-DPCH (HS-PDSCH) #2 phase difference detection section
233 SIR measurement/TPC detection/SW detection section
234 DPCH•HS-PDSCH decoding section
23b antenna verification section
235 FBI bit production section
236 FBI bit history storage section
237 SIR antenna weight estimation section
238 DPCH•HS-PDSCH antenna weight estimation section
24 baseband (BB) CPU
241 uplink synchronism establishment monitoring function section
242 first controlling section
243 uplink transmission starting monitoring function section
244 second controlling section
25 application (APL) section
26 external interface (IF)
27 sound inputting and outputting section
28 display section

BEST MODE FOR CARRYING OUT THE INVENTION

In the following, embodiments of the present invention are described with reference to the drawings.

[A] Description of the First Embodiment

FIG. 1 is a block diagram illustrating a configuration of essential part of a wireless communication system for explaining antenna verification operation in transmission diversity according to a first embodiment of the present invention.

The wireless communication system illustrated in FIG. 1 includes a wireless base station (BS) 1 and a wireless terminal (mobile station: MS) 2 for carrying out wireless communication with the BS 1 within a wireless area formed by the BS 1. If notice is taken of functions necessary for the antenna verification using an HSDPA method as a premise, then the BS 1 includes, for example, as a transmission system, two antennas (#1 and #2) 10-1 and 10-2, a dedicated physical channel (DPCH) and shared channel (HS-PDSCH) processing section 11, a shared pilot channel (CPICH) processing section 12 and a weight (weighting) setting section 13.

Here, the DPCH•HS-PDSCH processing section 11 produces a signal of dedicated physical channels (DPCH and HS-PDSCH) of the downlink to be transmitted to the MS 2 and the CPICH processing section 12 produces a signal (known signal between the BS 1 and the MS 2) of a CPICH, which is a pilot channel commonly used for a plurality of MSs 2, and the signals of the channels are transmitted from the antennas 10-1 and 10-2 toward the MS 2. It is to be noted that, in the following description, the CPICH and a combination of the DPCH and the HS-PDSCH transmitted from the antenna 10-1 are represented by CPICH #1 and DPCH #1, respectively, and the CPICH and a combination of the DPCH and the HS-PDSCH transmitted from the antenna 10-2 are represented by CPICH #2 and DPCH #2, respectively.

The weight (weighting) setting section 13 adaptively controls the phase (carrier phase) relationship between the signals (DPCHs #1 and #2) transmitted from the two antennas 10-1 and 10-2 based on feedback information (FBI bit) received with the dedicated physical channel (DPCH) of the uplink from the MS 2, and, in an example illustrated in FIG. 1, the weight setting section 13 multiplies the signal (DPCH #2) transmitted from the antenna 10-2 by a weight coefficient (antenna weight) corresponding to the FBI, in more detail, a weight coefficient for canceling the phase difference between the antennas 10-1 and 10-2 (between CPICH #1 and CPICH #2) on the MS 2 side to control the phase relationship between the DPCHs #1 and #2 transmitted from the two antennas 10-1 and 10-2. It is to be noted that the weight coefficient is multiplied to the CPICH #2 so as to be reflected on the CPICH #1 with 1-slot delay or 2-slot delay.

On the other hand, if notice is taken of a reception system, then as illustrated in FIG. 1, the MS 2 includes an antenna 20, a synchronism detection section 23a for carrying out synchronism detection of the signals (CPICH, DPCH, HS-PDSCH) received by the antenna 20 to decode reception DPCH and HS-PDSCH and an antenna verification section 23b for executing the antenna verification (including production of the FBI bit and transmission antenna weight estimation) by cooperation with the synchronism detection section 23a. It is to be noted that the antenna verification section 23b can be configured as firmware installed in a DSP (Digital Signal Processor) or the like.

Then, the synchronism detection section 23a has functions as a CPICH #1-CPICH #2 phase difference detection section 231, a CPICH #2-DPCH (HS-PDSCH) #2 phase difference detection section 232, an SIR measurement/TPC detection/SW detection section 233 and a DPCH•HS-PDSCH demodulation section 234, and the antenna verification section 23b has functions as an FBI bit production section 235, an FBI bit history storage section 236, an SIR antenna weight estimation section 237 and a DPCH•HS-PDSCH antenna weight estimation section 238.

Here, in the synchronism detection section 23a, the CPICH #1-CPICH #2 phase difference detection section 231 detects a carrier phase difference between the pilot channels (CPICH #1 and CPICH #2) received by the antenna 20 and the CPICH #2-DPCH (HS-PDSCH) #2 phase difference detection section 232 detects a carrier phase difference between the pilot channel (CPICH #2) and dedicated physical channel (DPCH #2) received by the antenna 20.

The SIR measurement/TPC detection/SW detection section 233 carries out measurement of the reception SIR (Signal to Interference Ratio), detection of a TPC (Transmission Power Control) bit and detection of a synchronizing word (SW) for the signals received by the antenna 20 based on an antenna weight estimated by the SIR antenna weight estimation section 237 hereinafter described, and the DPCH•HS-PDSCH demodulation section 234 demodulates the DPCHs and the HS-PDSCHs received by the antenna 20 based on an antenna weight estimated by the DPCH•HS-PDSCH antenna weight estimation section 238 hereinafter described. The detection section 233 and the DPCH•HS-PDSCH demodulation section 234 individually implement a function as a reception signal processing section for performing the process for the reception signals from the BS 1 based on results of estimation by the estimation sections 237 and 238. In particular, the reception signal process in the present embodiment is a concept including the processes of the measurement of the reception SIR, detection of the TPC bit, detection of the synchronizing word (SW) and demodulation of the DPCH and the HS-PDSCH.

On the other hand, in the antenna verification section 23b, the FBI bit production section 235 produces, as the phase controlling information, information relating to a phase rotation amount for minimizing (ideally to zero) the phase difference detected by the CPICH #1-CPICH #2 phase difference detection section 231 and transmits the produced information as the FBI bit to the BS 1 in the DPCH of the uplink and the FBI bit history storage section 236 stores history information of the FBI bit transmitted to the BS 1 therein.

The SIR antenna weight estimation section (estimation means) 237 calculates (estimates) the antenna weight to be used for the reception SIR detection by the SIR measurement/TPC detection/SW detection section 233 based on the carrier phase difference detected by the CPICH #2-DPCH (HS-PDSCH) #2 phase difference detection section 232 and the history of the FBI bit stored in the FBI bit history storage section 236 and the DPCH•HS-PDSCH antenna weight estimation section (estimation means) 238 calculates (estimates) the antenna weight to be used for the demodulation process by the DPCH•HS-PDSCH demodulation section 234 based on the carrier phase difference detected by the CPICH #2-DPCH (HS-PDSCH) #2 phase difference detection section 232 and the history of the FBI bit stored in the FBI bit history storage section 236, and the former estimation result is fed back to the SIR measurement/TPC detection/SW detection section 233 and the latter estimation result is fed back to the DPCH•HS-PDSCH demodulation section 234.

In particular, the antenna weight estimation sections 237 and 238, estimate, based on the carrier phase difference between the pilot channels in the current reception slot and the FBI bit history in the past, the antenna weights, which the BS 1 sets to data of the current reception slot, and feed back the estimation result to the synchronism detection section 23b (SIR measurement/TPC detection/SW detection section 233, DPCH•HS-PDSCH demodulation section 234) so that the reception SIR measurement and the demodulation of the DPCH and the HS-PDSCH are carried out.

Figure 2:
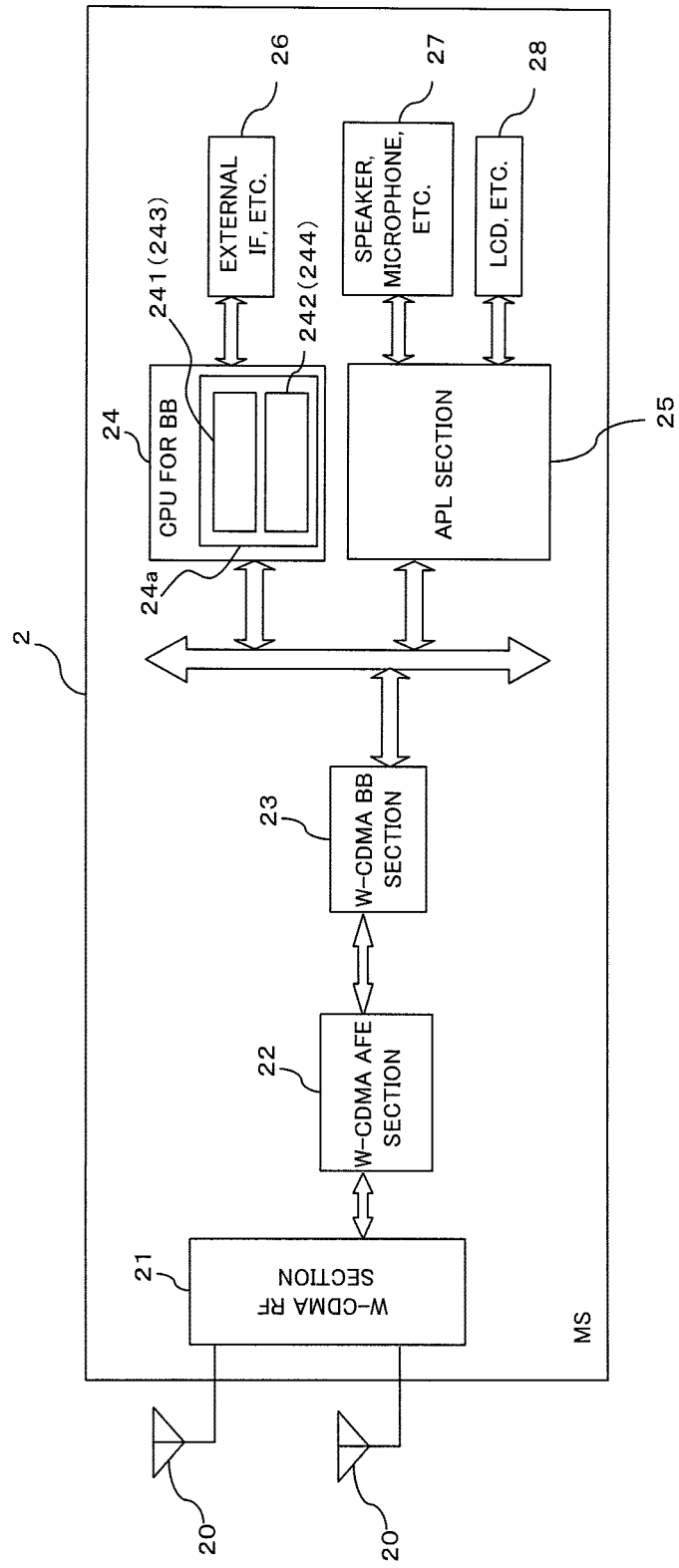
FIG. 2 is a block diagram wherein notice is taken of a hardware configuration of a mobile station illustrated in FIG. 1.

It is to be noted that, if notice is taken of a hardware configuration, then, for example, as illustrated in FIG. 2, the MS 2 includes an antenna 20, a W-CDMA wireless frequency (RF) section 21, a W-CDMA analog front end (AFE) section 22, a W-CDMA baseband (BB) section 23, a baseband (BB) CPU 24, an application (APL) section 25, an external interface (IF) 26 for allowing connection to an external equipment, a sound inputting and outputting section 27 such as a speaker, a microphone or the like and a display section 28 such as a liquid crystal display (LCD) or the like, and the synchronism detection section 23a and the antenna verification section 23b described above are provided individually as a function of the W-CDMA baseband section 23.

Here, the RF section 21 carries out a required reception RF process including amplification by a low-noise amplifier, frequency conversion (down convert) into an intermediate frequency (IF) band and so forth for a signal of the wireless frequency (RF) received by the antenna 20 and carries out a required transmission RF process including frequency conversion (up convert) into an RF band, amplification by a high-output amplifier and so forth for a transmission signal from the AFE section 22.

Further, the AFE section 22 carries out a required preprocess of the demodulation process including an amplification process, a band limitation process, frequency conversion (down convert) into a baseband frequency and so forth for a reception IF signal from the RF section 21 and carries out a required preprocess including frequency conversion (up convert) into the IF, a band limitation process, an amplification process and so forth for a transmission BB signal from the baseband section 23.

The BB section 23 carries out a required reception digital BB signal process including synchronism detection using the reception pilot signal, AD conversion for a digital signal process, a back diffusion process, multi-value orthogonal demodulation such as QPSK, 16QAM or the like, error correction decoding (for example, convolution decoding or turbo decoding) and so forth for the reception signal processed by the AFE section 22 under the control of the BB CPU 24 and carries out a required transmission digital BB signal process including error correction coding (for example, convolution coding or turbo coding), a diffusion process, multi-value orthogonal modulation such as QPSK, 16QAM or the like, DA conversion and so forth for the transmission signal (controlling data or application data) from the CPU 24 or the application section 25. Then, as described above, in the BB section 23, production and transmission of the FBI bit and the antenna verification process are carried out by the synchronism detection section 23a and the antenna verification section 23b.

It is to be noted that the BB CPU 24 controls the operation of the BB section 23 (synchronism detection section 23a and antenna verification section 23b) and the application section 25 processes and executes applications other than the BB signal process, and the BB CPU 24 and the application section 25 are connected for mutual communication with the BB section 23 through a bus or the like.

Then, the CPU (monitoring means, controlling means) 24 in the present embodiment has a function as an antenna verification controlling section 24a (refer to FIG. 2) for monitoring the communication state (phase) of the uplink to control the ON/OFF state of the antenna verification by the antenna verification section 23b in response to the communication state of the uplink as a result of the monitoring.

More particularly, the antenna verification controlling section 24a has functions as an uplink synchronism establishment monitoring function section 241 for monitoring whether or not synchronism of the uplink is established and a first controlling section 242 for controlling the antenna verification by the antenna verification section 23b in the ON state before establishment of the synchronism of the uplink is detected by the monitoring function section 241 but for controlling the antenna verification in the OFF state after establishment of synchronism of the uplink is detected.

Here, the control in the ON state is implemented by feeding back (reflecting) the estimation results by the antenna weight estimation sections 237 and 238 to (on) the synchronism detection section 23a [SIR measurement/TPC detection/SW detection section 233 and DPCH•HS-PDSCH demodulation section 234] and the control in the OFF state is implemented not by feeding back (reflecting) the estimation results.

It is to be noted that, while a state is illustrated in FIG. 2 wherein the antenna verification controlling section 24a is provided conveniently as one function of the CPU 24 in the CPU 24, the antenna verification controlling section 24a may be provided in the BB section 23 or the function as the controlling section 24a may be separately provided in the CPU 24 and the BB section 23.

(Antenna Verification in Transmission Diversity)

An antenna verification process upon transmission diversity application in the wireless communication system configured in such a manner as described above is described with reference also to FIG. 3.

Figure 3:
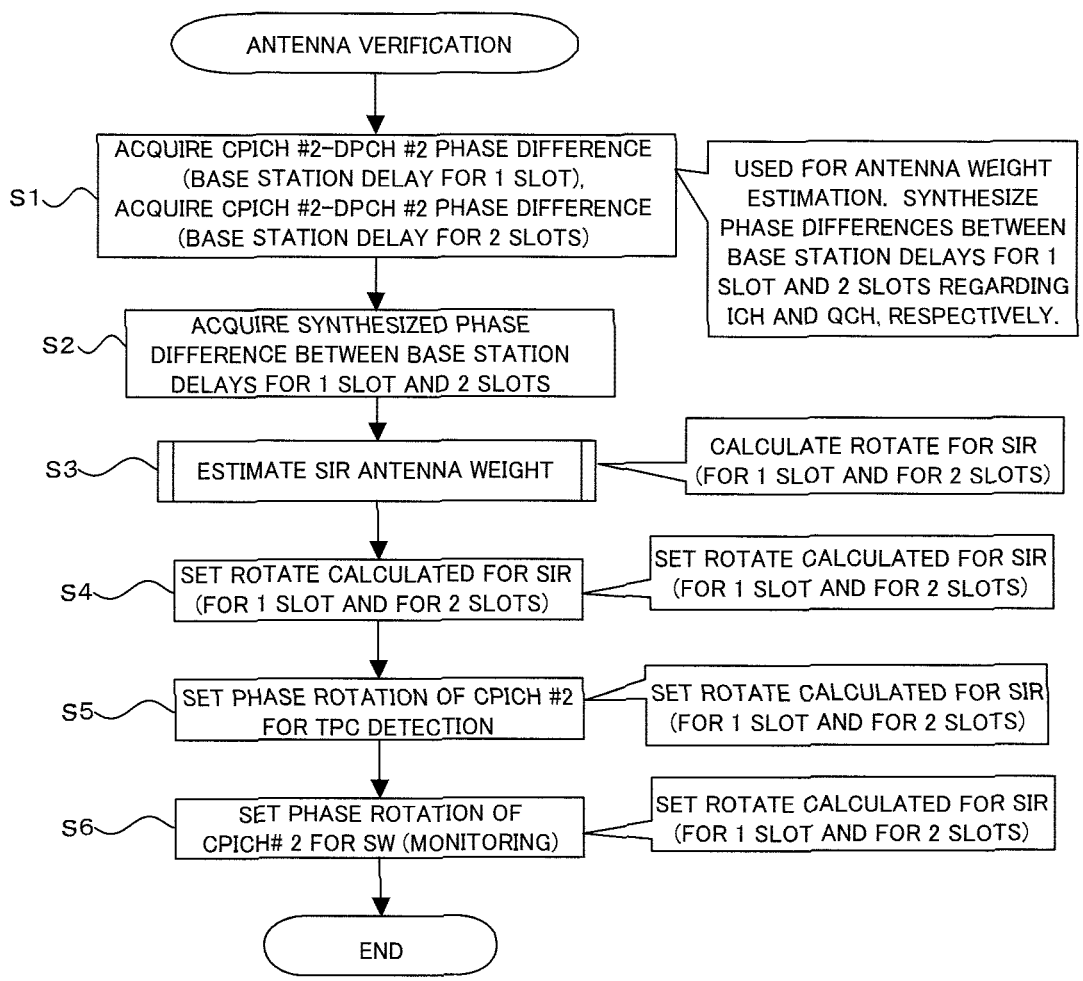
FIG. 3 is a flow chart illustrating basic operation of antenna verification in the mobile station illustrated in FIGS. 1 and 2.

As illustrated in FIG. 3, in the MS 2, the phase difference detection sections 231 and 232 of the synchronism detection section 23 detect a carrier phase difference for 2 slots between the CPICH #2 and the DPCH #2 transmitted from the two transmission antennas of the BS 1 for the antenna weight set in the 1-slot delay and the antenna weight set in the 2-slot delay in the BS 1 (step S1) and synthesize the carrier phase differences for two slots to acquire an averaged synthesized phase difference (step S2).

The synthesized phase difference is sent to the SIR antenna weight estimation section 237 of the antenna verification section 23b, and the SIR antenna weight estimation section 237 calculates the antenna weight (phase rotation amount ROTATE) set in the 1-slot delay and the antenna weight set in the 2-slot delay based on the FBI bit in the past stored in the FBI bit history storage section 236 (step S3).

Then, the SIR antenna weight estimation section 237 feeds back the antenna weights (phase rotation amounts ROTATE) for 2 slots to the SIR measurement/TPC detection/SW detection section 233 to set (reflect) the phase rotation amounts of the CPICH #2 for SIR measurement, TPC detection and SW detection (steps S4, S5, S6). Consequently, the SIR measurement/TPC detection/SW detection section 233 thereafter carries out SIR measurement, TPC detection and SW detection with reference to the set phase rotation amounts (antenna weights) of the CPICH #2.

Also the antenna weight for the DPCH is estimated by the DPCH•HS-PDSCH antenna weight estimation section 238 similarly to the CPICH #2 and a result of the estimation is fed back and set to and reflected on the DPCH•HS-PDSCH demodulation section 234, and the DPCH•HS-PDSCH demodulation section 234 thereafter carries out the demodulation process of the DPCH and the HS-PDSCH based on the reflected antenna weight. However, since, where the demodulation of the DPCH and the HS-PDSCH is carried out, a synchronizing word needs to be detected by the SIR measurement/TPC detection/SW detection section 233 so that synchronism (slot synchronism) of the downlink is established, the SIR antenna weight estimation section 237 needs to be able to carry out the estimation in shorter time and with higher accuracy than the DPCH•HS-PDSCH antenna weight estimation section 238.

Where the A-DPCH and the HS-PDSCH are started (synchronization is started) at the same time utilizing such antenna verification operation as described above as a premise, in the antenna verification process of the transmission diversity, there is a state wherein actually the FBI bit does not reach the BS 1 within a period of several frames after DPCCH transmission starting of the uplink till synchronism establishment of the uplink.

In this instance, while the antenna weight estimation sections 237 and 238 estimate the phase rotation amount (antenna weight) only from the history (received FBI bit in the past) of the FBI bit of the MS 2, if a condition overlaps that, during estimation, where the phases of the DPCH #1 and the DPCH #2 are opposite to each other, the power of the antenna #2 is higher, then there is the possibility that the MS 2 may mistake the transmission power increasing instruction (TPC command="1") from the BS 1 as a decreasing instruction (TPC command="0") and then fails in the synchronism establishment of the uplink, resulting in cutting of the link.

Figure 4:
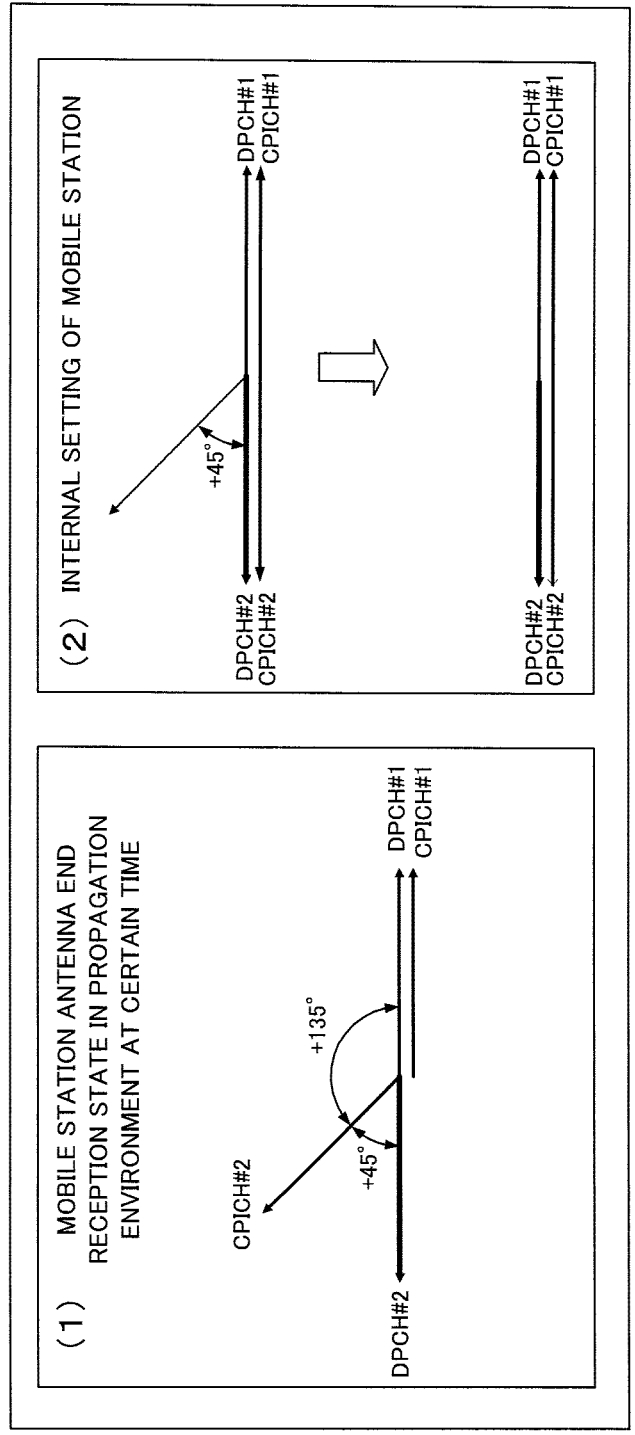
FIG. 4 is a schematic view illustrating a relationship (in a case wherein upward synchronism can be established) between phase rotation control and a carrier phase of a reception channel in the mobile station upon setting of the antenna verification to an OFF state.

For example, as illustrated in (1) of FIG. 4, a case is assumed wherein the phase difference between the antennas (CPICH #1-CPICH #2) is +135° as a result of a propagation environment. At this time, an initial value of the antenna weight (CPICH #2-DPCH #2) is +45°. It is to be noted that closed loop type transmission diversity (mode 1) used as specifications in the 3GPP is a method for controlling the transmission carrier phase of the dedicated physical channel (DPCH #2) of the second antenna 10-2 with a resolving power of a carrier phase of $\pi/4$ so that the phases of the reception signals from the two antennas 10-1 and 10-2 are substantially equal to each other in the MS 2, and the following description is given using the method just described as a premise.

If the antenna verification operates, then the phase of the CPICH #2 is rotated by the antenna weight estimation. Since the amount of the phase capable of being rotated at this time is equal to the resolving power of the carrier phase of $\pi/4$, there are four patterns of +45°, +135°, −135°, and −45°.

At this time, since the FBI bit does not reach the BS 1 within a period of several frames in a state after transmission starting of the uplink till synchronism establishment, the carrier phase (antenna weight) of the DPCH #2 on the BS 1 side remains fixed to 45°. On the other hand, as illustrated in (2) of FIG. 4, on the MS 2 side, the antenna weight estimation sections 237 and 238 calculate the phase rotation amount based only on the history of the FBI bit in the past stored in the FBI bit history storage section 236, and the calculated phase rotation amount is reflected to rotate the CPICH #2 in the direction of −45°.

Figure 8:
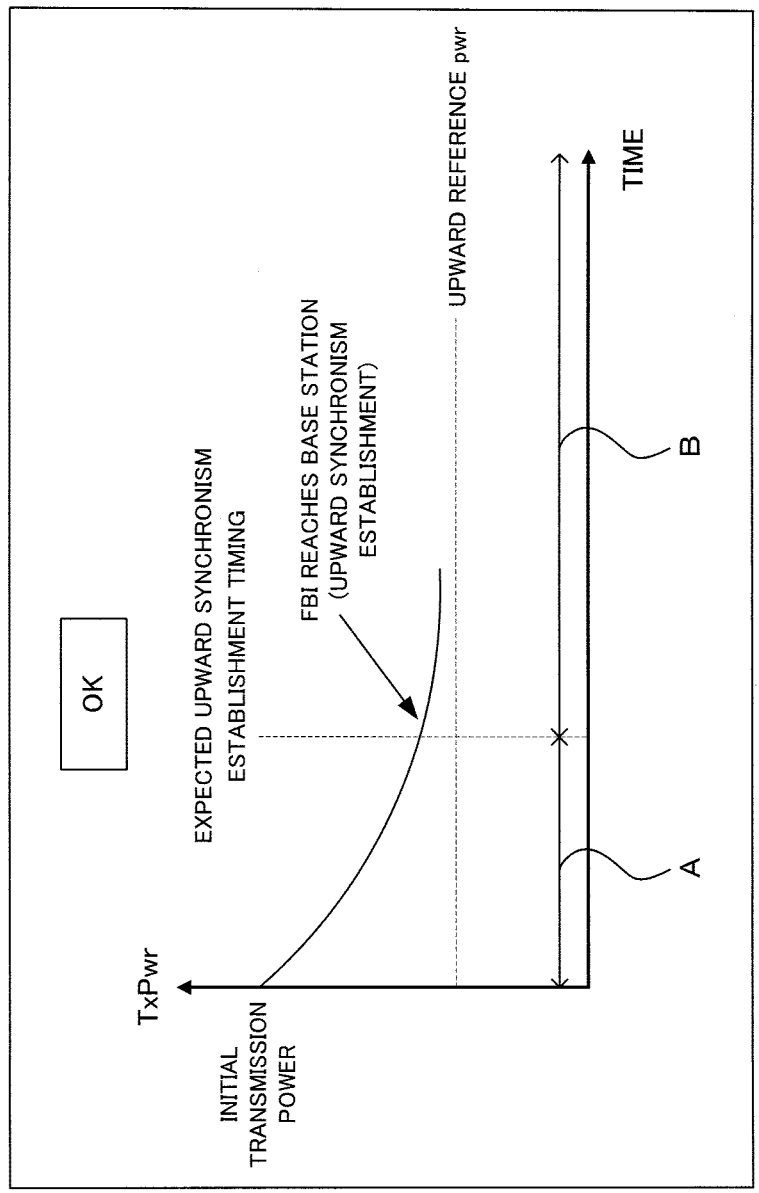
FIG. 8 is a view illustrating a variation of upward transmission power where upward synchronism can be established upon setting of the antenna verification to an OFF state.

Here, while the DPCH•HS-PDSCH demodulation section 234 of the MS 2 demodulates the DPCHs and the HS-PDSCHs based on a synthesis vector of the CPICH #1 and the CPICH #2, in a state illustrated at a lower stage of (2) of FIG. 4, the phases of the DPCH #1 and the DPCH #2 are opposite to each other and mutually decrease the reception power. However, since the phases in the set of the CPICH #1 (#2) and the DPCH #1 (#2) transmitted from the antennas 10-1 and 10-2 are same as each other, if the downward transmission power to the MS 2 decreases, then the TPC acts so as to increase the transmission power of the MS 2. Therefore, even if the antenna verification is controlled in the OFF state from the beginning as described in the description of the prior art, as illustrated in FIG. 8, the transmission of the uplink reaches the BS 1 (in particular, the upward transmission power of the MS 2 does not become less than the reference power necessary for upward synchronism establishment within both periods indicated by reference characters A and B) and the upward synchronism establishment can be implemented.

Figure 5:
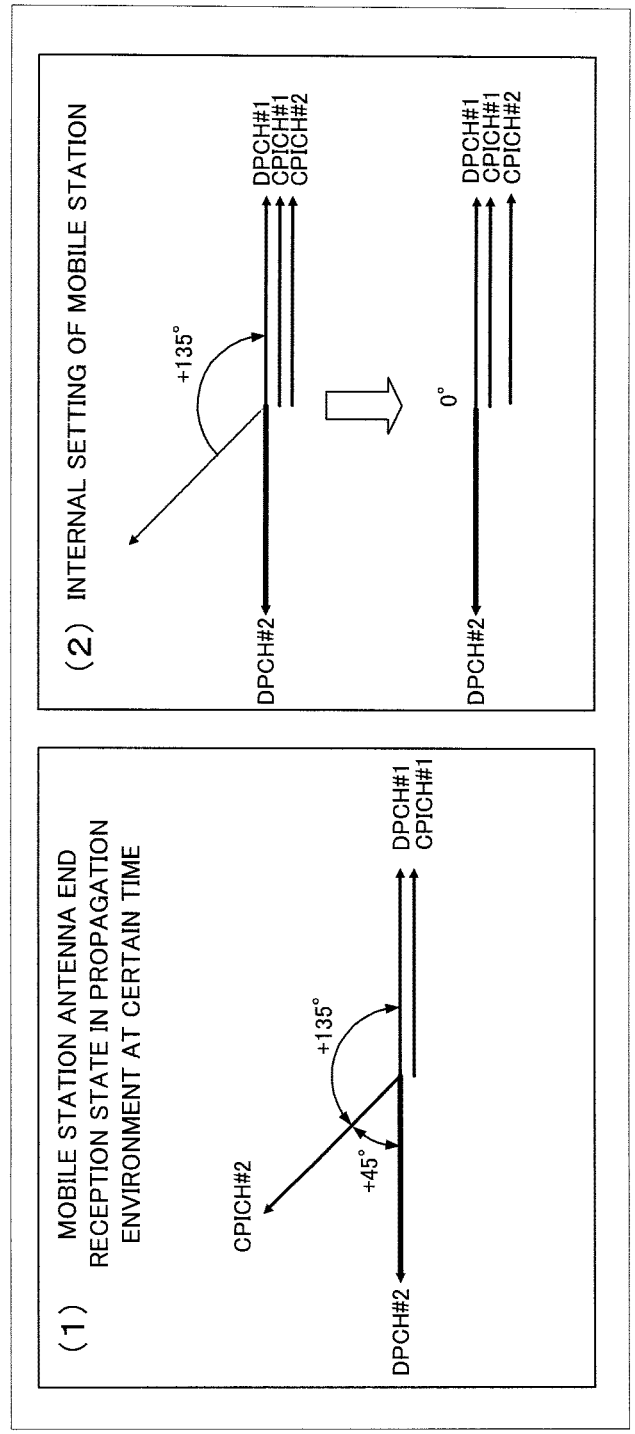
FIG. 5 is a schematic view illustrating a relationship (in a case wherein upward synchronism cannot be established) between phase rotation control and a carrier phase of a reception channel in the mobile station upon setting of the antenna verification to an OFF state.

On the other hand, where the CPICH #2 is rotated in the direction of +135° as illustrated in (2) of FIG. 5 by estimation only with the history of the FBI bit by the antenna verification, for example, from a state illustrated in (1) of FIG. 5, that is, from the carrier phase relationship illustrated in (1) of FIG. 4, the phases of the CPICH #2 and the DPCH #2 become opposite to each other.

Figure 6:
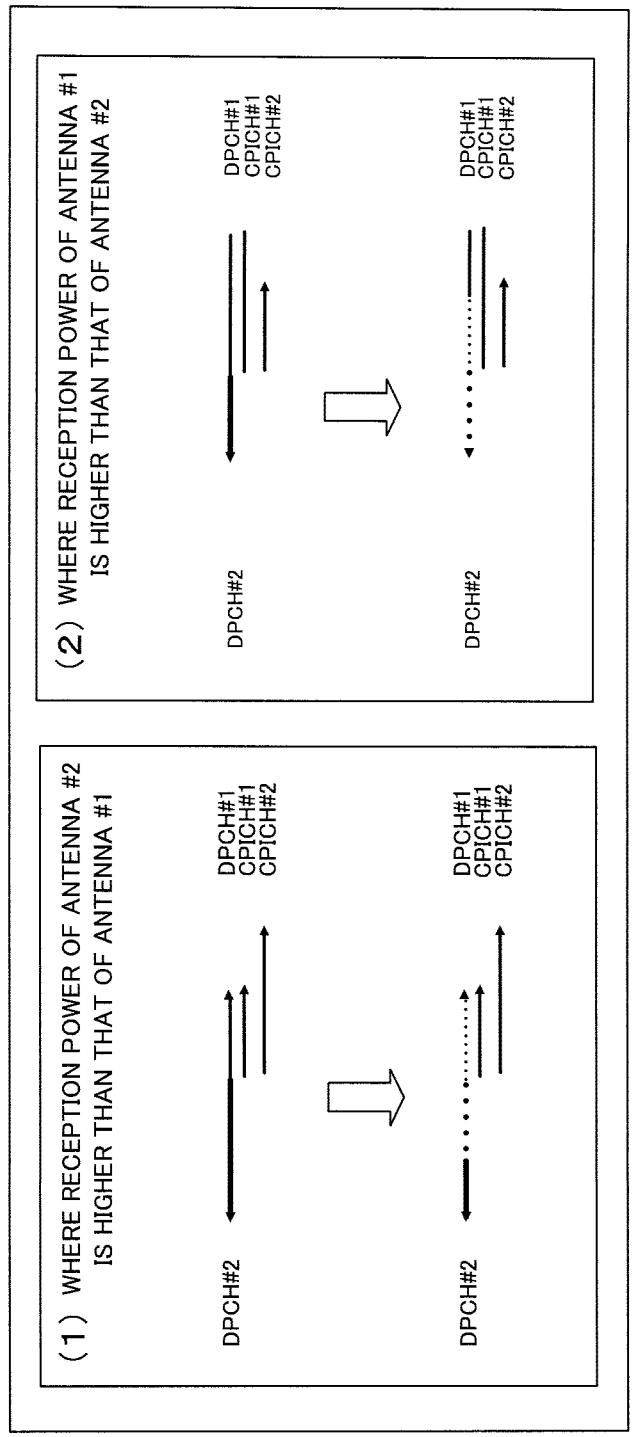
FIG. 6 is a schematic view illustrating a problem caused by a difference of the antenna reception power upon setting of the antenna verification to an OFF state.
Figure 7:
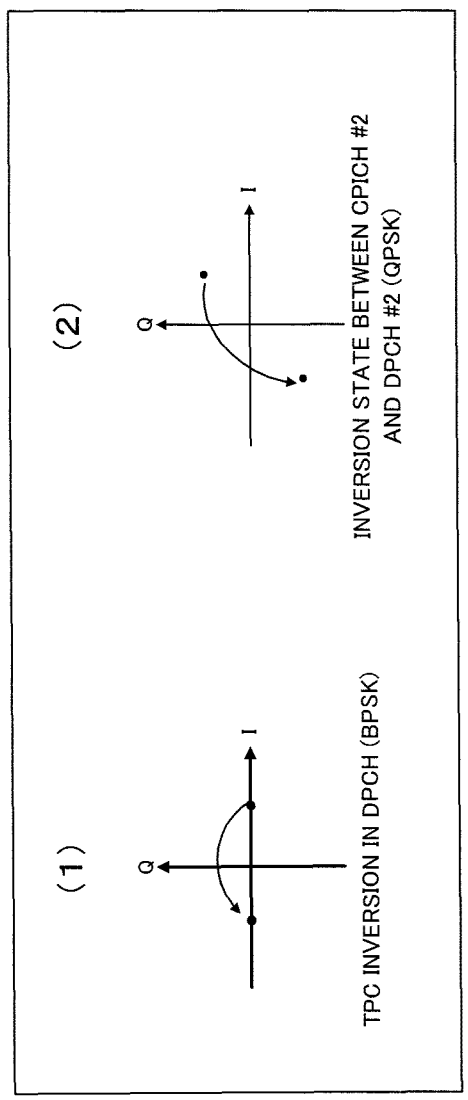
FIG. 7 is a schematic view illustrating another problem by a difference of the antenna reception power upon setting of the antenna verification to an OFF state.

At this time, where the reception power in the MS 2 of the signal transmitted from the antenna 10-2 is higher than that of the signal transmitted from the antenna 10-1 as illustrated in (1) of FIG. 6, only the opposite phase components of the CPICH #2 and the DPCH #2 equivalently remain. Therefore, it seems that all of the data in the DPCH and the HS-PDSCH are inverted as illustrated in (1) of FIG. 7, and also the TPC bit of the BPSK is inverted and the MS 2 mistakes the TPC command="1" (transmission power increasing instruction) as the TPC command="0" (transmission power decreasing instruction). Further, also the orthogonal components of the same phases in the DPCH and the HS-PDSCH are inverted and also the QPSK information is inverted as illustrated in (2) of FIG. 7.

Since, where the reception power in the MS 2 of the signal transmitted from the antenna 10-2 is higher than that of the signal transmitted from the antenna 10-2, as illustrated in (2) of FIG. 6, the DPCH #2 is cancelled by the power of the DPCH #1 and only the same phase components of the CPICH #1 and the DPCH #1 equivalently remain, such a problem as described above does not appear.

Figure 9:
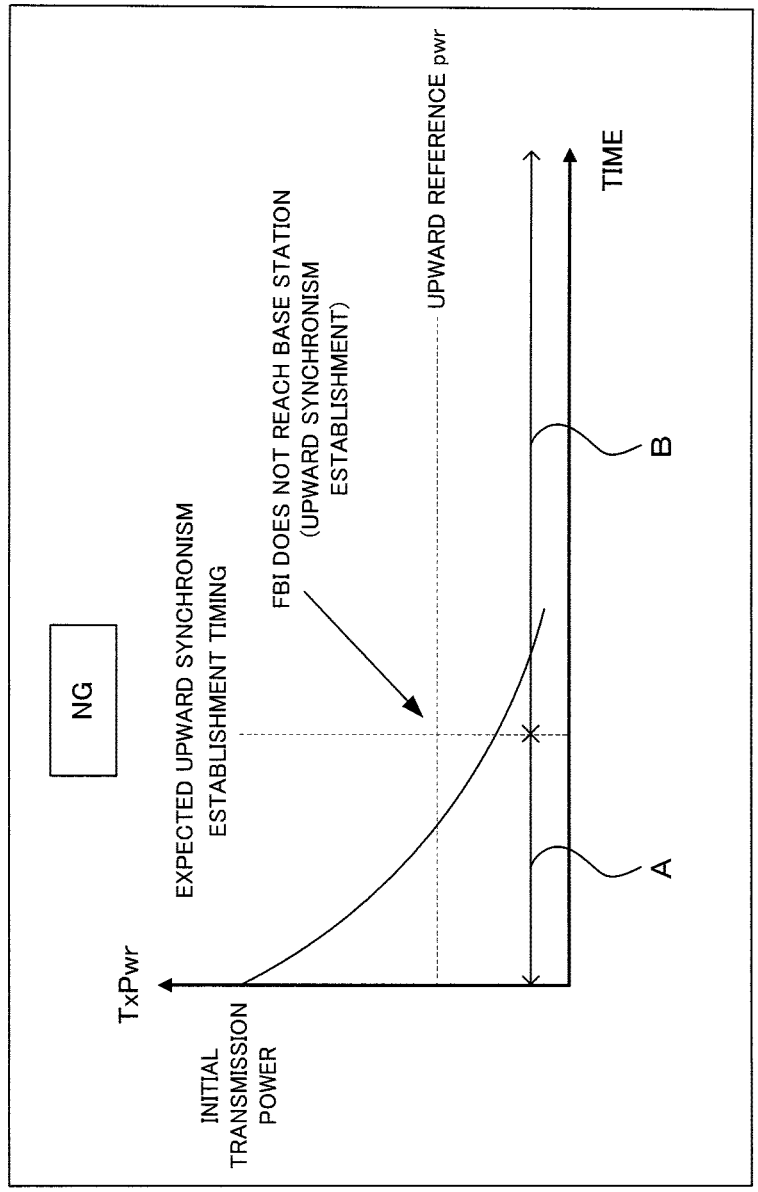
FIG. 9 is a view illustrating a variation of upward transmission power where upward synchronism cannot be established upon setting of the antenna verification to an OFF state.

Originally, while the opposite phase state between the DPCH #2 and the CPICH #2 can be eliminated by rotating the DPCH #2 by the antenna verification as described above, since, where the antenna verification is controlled in the OFF state from the beginning, the DPCH #2 cannot be rotated from the phase relationship of the CPICH #2, the MS 2 mistakes the TPC bit and continuously decreases the upward transmission power. As a result, the FBI bit does not reach the BS 1 and the antenna weight estimated by the MS 2 cannot be reflected on the BS 1, and upward synchronism cannot be established within a period A, within which upward synchronism can be established originally, for example, as illustrated in FIG. 9.

If it is assumed that such a phenomenon as described above occurs within an angle of ±15° in the propagation environment wherein the phases of the DPCH #1 and the DPCH #2 become opposite to each other, then where the probability P that such a phenomenon as described above may occur is calculated easily, the phenomenon occurs in a frequency calculated from a calculation expression as given below:

Probability $P$=(distribution probability of DPCH #2)×(probability that rotation in NG direction may be carried out based on transmission FBI bit history)×(probability that reception power in MS 2 from antenna 10-2 may be higher than that from antenna 10-1)=$30/360 \times 2/4 \times 1/2 = 0.02 = 2\%$ Therefore, in the present embodiment, by the antenna verification controlling section 24a, the antenna verification is controlled in the ON state before the upward synchronism establishment is detected but the antenna verification is controlled in the OFF state after the point of time, at which the upward synchronism establishment is detected. Consequently, the antenna verification operates within a period of several frames before the FBI bit reaches the BS 1 and then the upward synchronism is established, and therefore, the opposite phase state between the DPCH #1 and the DPCH #2 can be cancelled and the probability that the upward synchronism establishment may result in failure can be decreased.

The operation of the antenna verification control is described below with reference to FIGS. 10 and 11.

First, in response to power supply introduction or the like, the MS 2 starts synchronism establishment setting of the dedicated physical channel (A-DPCH) of the downlink (step S11) and starts synchronism establishment setting of the HS-PDSCH that is the common physical channel of the downlink (step S12). It is to be noted that the synchronism establishment setting signifies starting of a process for performing, through cooperation between the BB section 23 and the CPU 24, reception timing adjustment of the downlink (A-DPCH, HS-PDSCH) and detecting the synchronizing word (SW) of the downlink. Further, while the synchronism establishment setting operations of the dedicated physical channel and the common physical channel are executed normally at the same time, the synchronism establishment setting operations may be different from each other as indicated by reference characters T1 and T2 in FIG. 11.

Thereafter, the MS 2 starts information transmission of the uplink (DPCH) (step S13) and monitors, by means of the CPU 24, whether or not synchronism of the uplink is established (uplink synchronism establishment monitoring function section 241) (step S14). It is to be noted that, since the transmission and reception timings of the uplink and the downlink are determined in advance in the HSDPA method, establishment of the synchronism of the uplink can be detected by detecting the synchronizing word of the downlink by means of the SIR measurement/TPC detection/SW detection section 233 of the synchronism detection section 23a.

Then, if the synchronism establishment of the uplink is not detected, then the MS 2 controls the antenna verification in the ON state so that the antenna weights estimated by the antenna weight estimation sections 237 and 238 are reflected on the SIR measurement/TPC detection/SW detection section 233 and the DPCH•HS-PDSCH demodulation section 234 (from the N route of step S14 to step S15).

On the other hand, if the synchronism establishment of the uplink is detected, then the MS 2 controls the antenna verification in the OFF state so that the antenna weights estimated by the antenna weight estimation sections 237 and 238 are not reflected on the SIR measurement/TPC detection/SW detection section 233 and the DPCH•HS-PDSCH demodulation section 234 (from the Y route of step S14 to step S16).

By the operation described above, for example, as illustrated in FIG. 11, the MS 2 controls the antenna verification in the ON state within the period after starting of the synchronism establishment setting of the dedicated physical channel and the common physical channel of the downlink till the establishment of the synchronism of the uplink (period from T1 to T4) but controls the antenna verification in the OFF state after the synchronism establishment (T4).

In particular, since, even if the FBI bit does not reach the BS 1 and then the antenna weight remains in an initially set state within a period of several frames after transmission starting of the uplink till synchronism establishment of the uplink, the antenna verification operates, the estimation of the antenna weight (CPICH #2-DPCH #2) is carried out.

Accordingly, the antenna weight estimation, by which the DPCH #2 obtains an expected phase, is carried out normally and the CPICH #2 is rotated coaxially (in the same phase) with the DPCH #2 so that such an opposite phase state between the CPICH #2 and the DPCH #2 as illustrated in (2) of FIG. 5 can be cancelled. As a result, such a probability that the TPC bit may be mistaken as described above can be decreased and the probability that synchronism of the uplink can be correctly established can be increased.

[B] Description of the Second Embodiment

Figure 10:
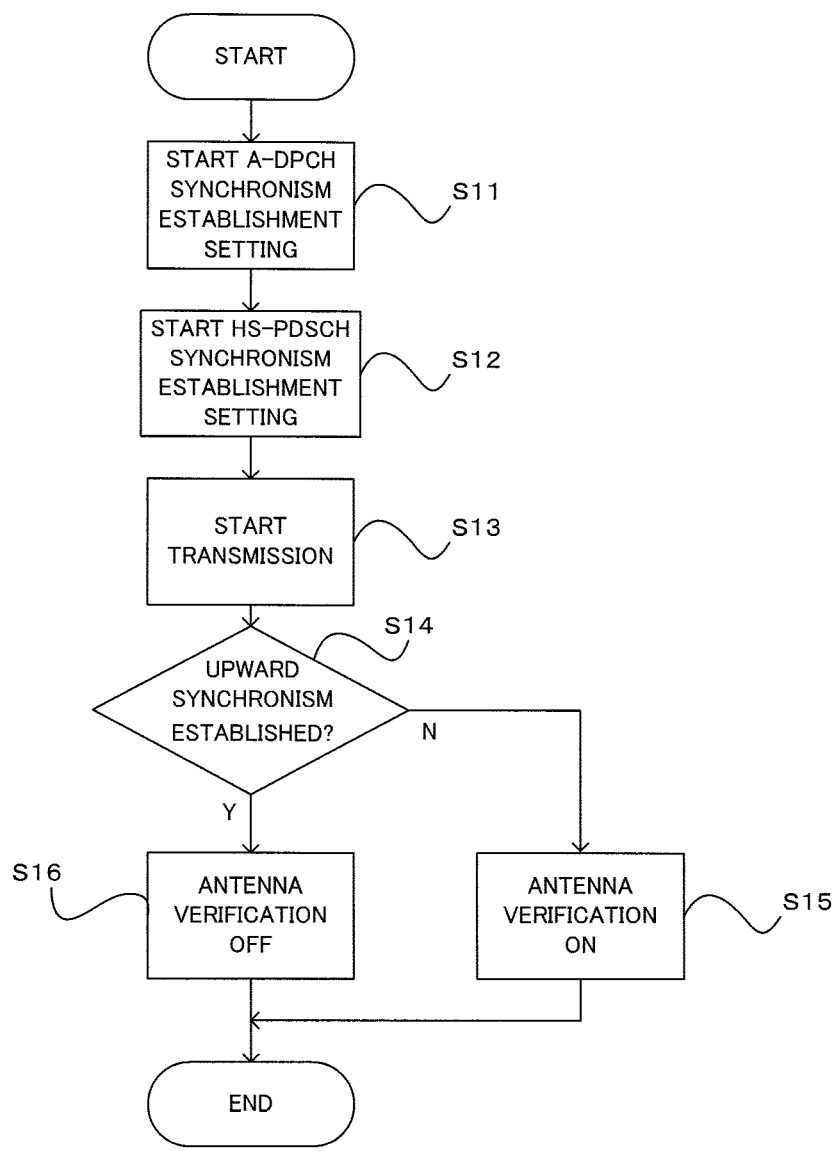
FIG. 10 is a flow chart illustrating operation (antenna verification control) of the mobile station illustrated in FIGS. 1 and 2.
Figure 11:
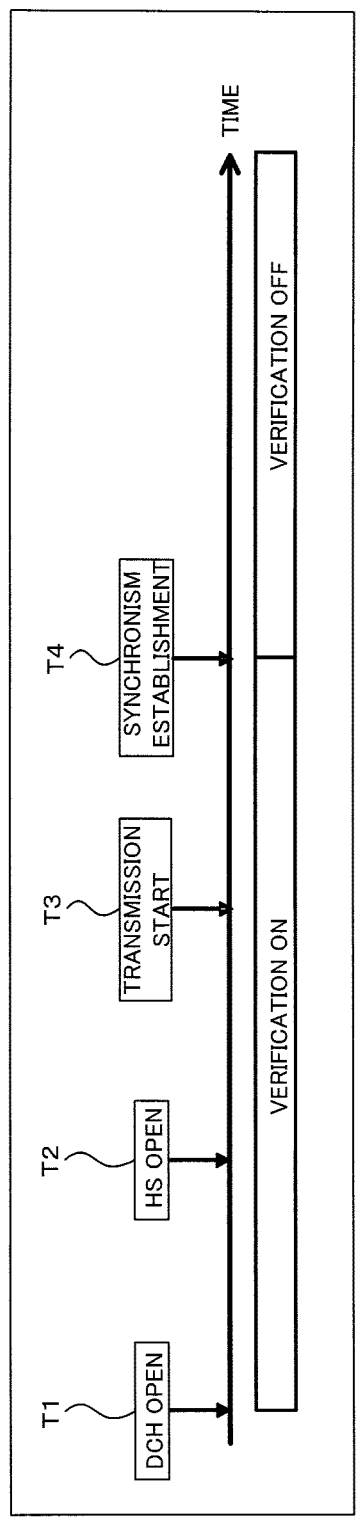
FIG. 11 is a timing chart illustrating the operation (antenna verification control) of the mobile station illustrated in FIGS. 1 and 2.
Figure 12:
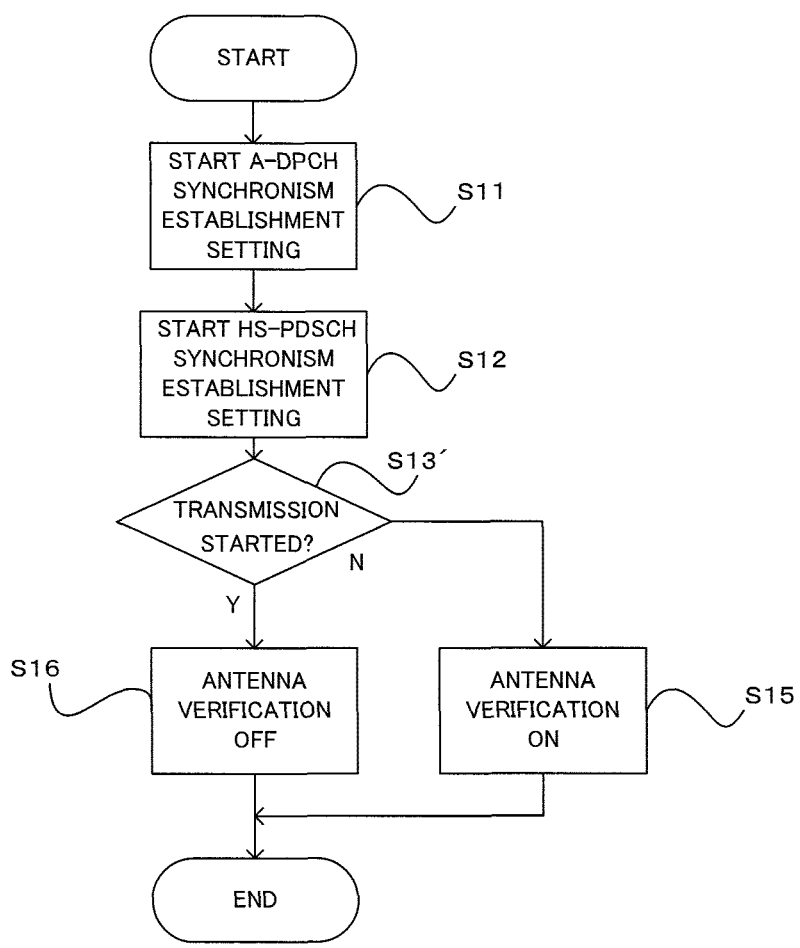
FIG. 12 is a flow chart illustrating operation (antenna verification control) of a mobile station according to a second embodiment.
Figure 13:
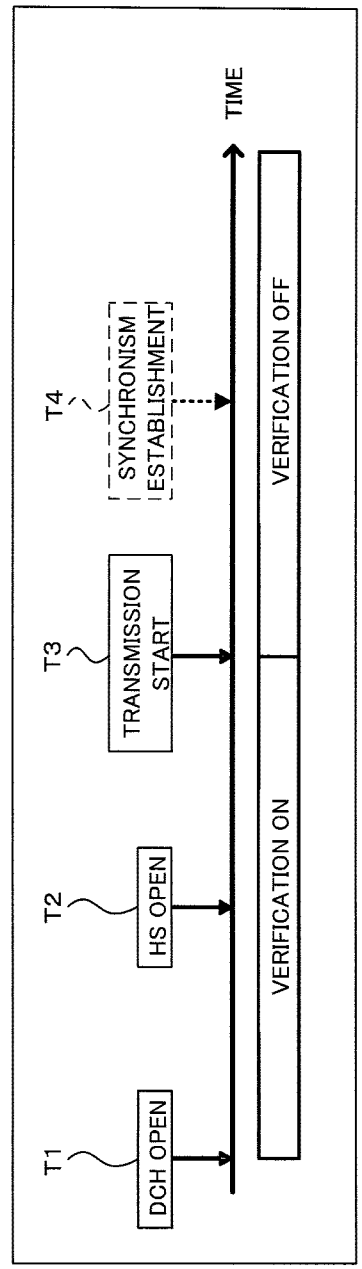
FIG. 13 is a timing chart illustrating the operation (antenna verification control) of the mobile station according to the second embodiment.

While, in the MS 2 of the first embodiment described above, the antenna verification is controlled in the ON state before synchronism establishment of the uplink is detected but the antenna verification is controlled in the OFF state after the synchronism establishment is detected as illustrated in FIGS. 10 and 11, the antenna verification may be controlled in the ON state before transmission of the uplink is started and the antenna verification may be controlled in the OFF state after the transmission is started, for example, as illustrated in FIGS. 12 and 13.

In particular, by power supply introduction or the like, the MS 2 in the present embodiment starts synchronism establishment setting of the dedicated physical channel (A-DPCH) and the common physical channel (HS-PDSCH) of the downlink (steps S11 and S12) and then monitors, by means of the CPU 24, whether or not information transmission of the uplink (DPCH) is started (step S13').

As a result, if the transmission starting of the uplink is not detected, then the MS 2 controls the antenna verification in the ON state so that the antenna weights estimated by the antenna weight estimation sections 237 and 238 are reflected on the SIR measurement/TPC detection/SW detection section 233 and the DPCH•HS-PDSCH demodulation section 234 (from an N route of step S13' to step S15).

On the other hand, if the transmission starting of the uplink is detected, then the MS 2 controls the antenna verification in the OFF state so that the antenna weights estimated by the antenna weight estimation sections 237 and 238 are not reflected on the SIR measurement/TPC detection/SW detection section 233 and the DPCH•HS-PDSCH demodulation section 234 (from a Y route of step S13' to step S16).

It is to be noted that, as indicated by a reference character with parentheses in FIG. 2, the monitoring controlling function in the present embodiment is implemented by providing, as the antenna verification controlling section 24a, functions as an uplink transmission starting monitoring function section 243 for monitoring whether or not transmission starting of the uplink is detected and a second controlling section 244 for controlling the antenna verification by the antenna verification section 23b in the ON state before the transmission starting of the uplink is detected by the monitoring function section 243 but for controlling the antenna verification in the OFF state after the transmission starting of the uplink is detected.

By the operation described above, as illustrated in FIG. 13, the MS 2 in the present embodiment controls the antenna verification in the ON state within the period after the synchronism establishment setting starting of the dedicated physical channel and the common physical channel of the downlink till transmission starting of the uplink (period from T1 to T3) but controls the antenna verification in the OFF state after the synchronism establishment (T3).

In particular, in the present embodiment, it is considered that appearance of the opposite phase state between the CPICH #2 and the DPCH #2 is a temporal state by the propagation environment, and the antenna verification is controlled from the ON state to the OFF state at a point of time of the transmission starting of the uplink, which is a stage earlier than that in the case of the first embodiment.

Accordingly, since the antenna verification operates at least before the transmission of the uplink is started, the estimation of the antenna weights (CPICH #2-DPCH #2) is carried out and then the opposite phase state between the CPICH #2 and the DPCH #2 can be cancelled. As a result, such a probability that the TPC bit may be mistaken as described above can be decreased and the probability that the synchronism of the uplink can be established normally can be increased.

It is to be noted that, while the description in the case of the HSDPA communication method (W-CDMA communication method specification standard 3GPP release 5) is given above in the description of the embodiments of the present invention, the embodiments of the present invention can be applied similarly also as in a case wherein the antenna verification is carried out in the bearer of the conventional W-CDMA method (prior to the W-CDMA communication method specification standard 3GPP release 4). In this instance, the DPCH•HS-PDSCH processing section 11, DPCH•HS-PDSCH demodulation section 234, DPCH•HS-PDSCH antenna weight estimation section 238 handle only the DPCH signal.

INDUSTRIAL APPLICABILITY

As described above in detail, with the present invention, it is expected that, since the probability that the transmission power controlling information of the downlink may be mistaken is decreased to enhance the probability that the synchronism establishment of the uplink may result in success, the present invention is very useful to the wireless communication technical field.

The invention claimed is:

1. A mobile station for communicating with a wireless base station that controls the phase of signals to be transmitted from two antennas based on feedback information from the mobile station, the mobile station comprising:
   an estimating unit which estimates the phase of the signals from the two antennas;
   a reception signal processor which carries out a reception signal process to a reception signal from the wireless base station based on a result of the estimation by the estimating unit; and
   a controller which controls a timing of reflecting the estimation result by the estimating unit on the reception signal processor in response to a stage in a process of communication regarding an uplink to the wireless base station,
   wherein in controlling a timing of reflecting the estimation result, the controller causes the estimation result to reflect on the reception signal process before the establishment of the synchronism of the uplink but not to cause the estimation result to reflect on the reception signal process after the synchronism is established.

2. A mobile station for communicating with a wireless base station that controls the phase of signals to be transmitted from two antennas based on feedback information from the mobile station, the mobile station comprising:
   an estimating unit which estimates the phase of the signals from the two antennas;

a reception signal processor which carries out a reception signal process to a reception signal from the wireless base station based on a result of the estimation by the estimating unit; and a controller which controls a timing of reflecting the estimation result by the estimating unit on the reception signal processor in response to a stage in a process of communication regarding an uplink to the wireless base station, wherein in controlling a timing of reflecting the estimation result, the controller causes the estimation result to reflect on the reception signal process at least before starting of the transmission of the uplink but not to cause the estimation result to reflect on the reception signal process after the transmission starting.

3. An antenna verification controlling method for a mobile station that communicates with a wireless base station that controls the phase of signals to be transmitted from two antennas based on feedback information from the mobile station, the antenna verification controlling method comprising:

estimating the phase of signals from the two antennas;

carrying out a reception signal process to a reception signal from the wireless base station based on a result of the estimating; and controlling a timing of reflecting the estimation result on the reception signal process in response to a stage in a process of communication regarding an uplink to the wireless base station, wherein, in controlling a timing of reflecting the estimation result, a result of the estimation is caused to reflect on the reception signal process before establishment of the synchronism of the uplink but the estimation result is not caused to reflect on the reception signal process after the synchronism is established.

4. An antenna verification controlling method for a mobile station that communicates with a wireless base station that controls the phase of signals to be transmitted from two antennas based on feedback information from the mobile station, the antenna verification controlling method comprising:

estimating the phase of signals from the two antennas;

carrying out a reception signal process to a reception signal from the wireless base station based on a result of the estimating; and controlling a timing of reflecting the estimation result on the reception signal process in response to a stage in a process of communication regarding an uplink to the wireless base station, wherein, in controlling a timing of reflecting the estimation result, the estimation result is caused to reflect on the reception signal process at least before starting of the transmission of the uplink but the estimation result is not caused to reflect on the reception signal process after the transmission starting.

* * * * *